(12) United States Patent
Kim et al.

(10) Patent No.: US 6,399,675 B1
(45) Date of Patent: Jun. 4, 2002

(54) ELECTRICALLY CONDUCTIVE MICROGEL AND METHOD FOR PREPARING THE SAME

(75) Inventors: Yang-Bae Kim, Ulsan; Chan-Ho Park, Taejon; Jin-Who Hong, Sungnam-si, all of (KR)

(73) Assignee: Q-Sys Co., Ltd., Gwangju-Si (KR)

( * ) Notice: Subject to any disclaimer, the term of this patent is extended or adjusted under 35 U.S.C. 154(b) by 0 days.

(21) Appl. No.: 09/787,689

(22) PCT Filed: Jan. 18, 2001

(86) PCT No.: PCT/KR01/00091
§ 371 (c)(1),
(2), (4) Date: Mar. 21, 2001

(87) PCT Pub. No.: WO01/92377
PCT Pub. Date: Dec. 6, 2001

(30) Foreign Application Priority Data

May 27, 2000 (KR) .......................................... 2000-28883
Oct. 5, 2000 (KR) .......................................... 2000-58447

(51) Int. Cl.$^7$ .......................... C08K 9/04; C08G 73/00; C08G 75/00
(52) U.S. Cl. ...................... 523/206; 523/137; 523/201; 528/378; 528/422; 528/423; 252/500; 428/407
(58) Field of Search ............................. 528/378, 422, 528/423, 487; 523/137, 201, 206

(56) References Cited

U.S. PATENT DOCUMENTS

| | | | |
|---|---|---|---|
| 4,403,003 A | 9/1983 | Backhouse | 427/407.1 |
| 5,008,041 A * | 4/1991 | Cameron et al. | |
| 5,028,354 A * | 7/1991 | Smith et al. | |
| 5,147,913 A * | 9/1992 | MacDiarmid et al. | |
| 5,795,953 A * | 8/1998 | Kim et al. | |
| 6,001,549 A | 12/1999 | Nair et al. | 430/528 |
| 6,025,462 A | 2/2000 | Wang et al. | 528/377 |

* cited by examiner

Primary Examiner—Tae H. Yoon
(74) Attorney, Agent, or Firm—Abelman, Frayne & Schwab

(57) ABSTRACT

Disclosed are electrically conductive microgel and preparation thereof. The electrically conductive microgel is prepared by adding 3 to 30 weight % of a monomer for synthesizing electrically conductive polymer and 1 to 20 weight % of a dopant to 15 to 80 weight % of an organic solution containing 5 to 60 weight % of microgel particles and polymerizing said monomer at a temperature of 0 to 80 ° C. under the addition of 2 to 40 weight % of an aqueous solution containing 1 to 40 weight % of an oxidative polymerization catalyst, in which the polymer adsorbed on the surface of the microgel particles. The electrically conductive microgel takes a core/shell structure in which electrically conductive polymers or oligomers are physically adsorbed onto the internal crosslinked microgel particles. With a three-dimensional array of the electrically conductive polymers or oligomers, the microgel shows excellent electrical functions, including electrical conduction, electromagnetic-radio frequency interference shielding, and electrostatic prevention, in spite of its low content of electrically conductive polymers.

12 Claims, No Drawings

ELECTRICALLY CONDUCTIVE MICROGEL AND METHOD FOR PREPARING THE SAME

BACKGROUND OF THE INVENTION

1. Field of the Invention

The present invention relates to electrically conductive microgel. More particularly, the present invention relates to electrically conductive microgel in which electrically conductive polymers or oligomers can be polymerized on the surface of microgel particles dispersed in an organic solvent, in the presence of a dopant and an oxidative polymerization catalyst, granting excellent conductivity to the microgel Also, the present invention is concerned with a method for preparing such electrically conductive microgel.

2. Description of the Prior Art

A number of applications of electrically conductive polymers for surface tension control, electromagnetic wave shielding, fuel batteries, etc. have been under study. Particularly, polyaniline, polypyrrole, and polythiophene are stable in air with high electrical conductivity. Another advantage of these conductive polymers is that they can be easily synthesized through electrochemical or chemical polymerization. However, films made of the electrically conductive polymers synthesized through electrochemical polymerization, although being constant in electrical conductivity across their surface areas, are greatly limited in uses because they are not easily melted owing to the strong intermolecular attractive force thereof. Powders of the electrically conductive polymers synthesized through chemical polymerization require complicated post-treatment processing for their applications.

Recently, extensive research has been directed to improving the processability of electrically conductive polymers. Preparation of water-soluble multi-component composite particles through chemical polymerization is an example of such research. Korean Pat. Laid-Open Publication No. 99-018821 discloses a method of preparing polyaniline and polypyrrole within ABS emulsion latex while using an organic acid such as dodecylbenzene sulfonic acid or para-toluene sulfonic acid as a dopant and ammonium persulfate as an oxidant. This method, however, is disadvantageous in that, when the monomers are polymerized, the presence of ion groups within the dopant and the emulsifier of the emulsion latex causes the monomers to be in an unstable water dispersion, resulting in undesired precipitation of powder. In turn, this precipitated powder is difficult to form into transparent films as well as requires additional homogenizing processes, such as pulverization and fine dispersion, in order that the powder can be coated on cloth or used in extrusion molding.

U.S. Pat. No. 6,001,549 describes an antistatic composition comprising electrically conductive polymer particles and copolymer microgel particles. The antistatic composition shows good conductivity at relatively low volume fraction of the electrically conductive particles by including microgel particles, which are prepared using an aqueous medium. However, the electrically conductive particles, selected from metal oxides, metal antimonates and ceramic particles, are unsuitable to give transparent or low anti reflective coating films.

U.S. Pat. No. 6,025,462 discloses an electrically conductive dendrimer whose reactive functional groups on its surface are useful to synthesize an electrically conductive polymer for composite particles which have been shown to solve the above problem encountered in the previous patent to some degree. However, the preparation process is too complicated to avoid imposing limitations on its commercialization.

SUMMARY OF THE INVENTION

Leading to the present invention, the intensive and thorough research on electrically conductive microgel, conducted by the present inventors, resulted in the finding that electrically conductive polymers or oligomers can be polymerized in a dispersion of microgel particles in the presence of a dopant and an oxidative polymerization catalyst and adsorbed onto the particle, granting excellent conductivity to the microgel particles.

Therefore, it is an object of the present invention to provide a method for preparing an electrically conductive microgel, by which excellent electrical conductivity can be obtained. It is another object of the present invention to provide an electrically conductive microgel which has a three-dimensional array of electrically conductive polymers in association with a polymeric binder, thereby showing excellent electrical conductivity, electromagnetic wave shielding, electrostatic prevention and film performance even though a small quantity of electrically conductive polymers are present therein.

In accordance with the present invention, there is provided a method for preparing an electrically conductive microgel comprising adding 3 to 30 weight % of a monomer for synthesizing electrically conductive polymer and 1 to 20 weight % of a dopant to 15 to 80 weight % of an organic solution containing 5 to 60 weight % of microgel particles and polymerizing said monomer at a temperature of 0 to 80° C. under the addition of 2 to 40 weight % of an aqueous solution containing 1 to 40 weight % of an oxidative polymerization catalyst, in which the polymer adsorbed on the surface of the microgel particles.

In accordance with another object of the present invention, there is provided an electrically conductive microgel suitable for use in electrical conduction, electromagnetic-radio frequency interference shielding, electrostatic discharge protection and anti-fogging.

DETAILED DESCRIPTION OF THE INVENTION

In the present invention, electrically conductive microgel is prepared by synthesizing electrically conductive polymers on the surface of microgel particles dispersed in an organic solvent and adsorbing the synthesized polymers thereonto. The microgel particles useful in the present invention are intramolecularly crosslinked, ultra-fine polymer particles with an average diameter of 0.01 to 10 microns and can be typically prepared by two processes. For reference, the term "an organic solution containing microgel" or "a microgel-containing organic solution" as used herein refers to a dispersion of microgel particles in an organic solvent.

One process for preparing a dispersion of microgel particles in an organic solvent is described in U.S. Pat. No. 4,403,003, which teaches a non-aqueous dispersion (AND) process. Also, a dispersion of microgel particles in an organic solvent can be obtained by a combination of emulsion polymerization and aqueous-organic solvent conversion, as taught in European Pat. Pub. No. 029637.

In the AND process, vinyl monomers are polymerized to microgel through dispersion polymerization in the presence of a polymer stabilizer in an organic solvent. With a steric stabilization ability, the polymer stabilizer acts to inhibit the flocculation of the microgel produced. In detail, the polymer stabilizer provides an energy barrier against particle flocculation by forming a chain extended configuration of the polymer around individual microgel particles. In the '003 patent, the polymer stabilizer is prepared as follows. 12-Hydroxystearic acid is self-condensed to an acid value of about 31 to 34 mg KOH/g (corresponding to a number average molecular weight of 1650 to 1800) and then reacted with an equivalent amount of glycidyl methacrylate. The resulting unsaturated ester is copolymerized at a weight ratio of 2:1 with a mixture of methyl methacrylate and acrylic acid in the proportions of 95:5.

In another process, microgel can be prepared by the emulsion polymerization of vinyl monomers together with crosslinking monomers (e.g. divinyl monomers) in the presence of an emulsifier. Aqueous emulsions of microgel particles are being used industrially for an excellent metallic effect in paints for automobiles. In the present invention, however, a dispersion of microgel particles in an organic solvent is required, which can be obtained through the aqueous-organic solvent conversion process. This conversion process is known as a coagulation process as taught in WO 91/00895 and EP Publication No. 029638. When n-butanol is added to an aqueous microgel emulsion, coagulation of microgel particles occurs, resulting in the separation into two phases: a lower phase containing n-butanol, water and the emulsifier and an upper phase containing the microgel particles, n-butanol and the other components. The upper phase is azeotropically distilled in vacuo to remove residual water, thus obtaining a dispersion of microgel particles in an organic solvent.

Monomers suitable for use in forming the microgel particles used in the present invention are addition polymerizable monomers containing ethylenically unsaturated or more specifically vinylic, acrylic and/or allylic groups. Representative examples of the monomers include n-pentyl acrylate, n-butyl acrylate, benzyl acrylate, t-butyl methacrylate, 1,1-dihydroperfluorobutyl acrylate, benzyl methacrylate, chloromethylstyrene, ethyl methacrylate, isobutyl acrylate, 2-ethylhexyl acrylate, 2-ethylhexyl methacrylate, chloroprene, n-butyl methacrylate, isobutyl methacrylate, isopropyl methacrylate, lauryl acrylate, lauryl methacrylate, methyl acrylate, 2-ethoxyethyl acrylate, 2-ethoxyethyl methacrylate, 2-cyanoethyl acrylate, phenyl acrylate, isopropyl acrylate, n-propyl methacrylate, n-hexyl acrylate, 2-hydroxyethyl acrylate, 2-hydroxyethyl methacrylate, styrene, vinylbenzyl acetate, vinyl benzoate and mixtures thereof.

Crosslinking monomers useful for forming the microgel particles used in the present invention are exemplified by allyl methacrylate, N,N'-methylenebisacrylate, ethylene dimethacrylate, 2,2-dimethyl-1,3-propylene diacrylate, divinylbenzene, N,N'-bis(methacryloyl)urea, 4,4'-isoproylidenediphenylene diacrylate, 1,3-butylene diacrylate, 1,4-cyclohexylenedimethylene dimethacrylate, ethylene diacrylate, 1,6-hexamethylene diacrylate, 1,6-diacrylamidohexane, 1,6-hexamethylene dimethacrylate, tetramethylene dimethacrylate, ethylenebis(oxyethylene) diacrylate, ethylenebis(oxyethylene)dimethacrylate, ethylenetrimethacrylate and 2-crotonoyloxyethyl methacrylate.

To be suitable for use in the present invention, the microgel particles have to range, in size, from about 0.01 to 10 microns and more preferably from about 0.01 to 1 micron. The microgel content in an organic solvent is preferably maintained in the range from 5 to 60 weight %. If the content of microgel particles is less than 5 weight %, the effects obtained by the addition thereof cannot be expected. On the other hand, a dispersion containing more than 60 weight % of microgel particles is too viscous to handle with ease.

In accordance with the present invention, the electrically conductive microgel is prepared by adding 3 to 30 weight % of monomers for synthesizing electrically conductive polymer and 1 to 20 weight % of dopants to 15 to 80 weight % of an organic solution containing 5 to 60 weight % of microgel particles and then polymerizing the monomers under the addition of 2 to 40 weight % of an aqueous solution containing 5 to 40 weight % of an oxidative polymerization catalyst. The synthesized polymer is adsorbed on the surface of the microgel particles. In the case of the monomers to be polymerized to an electrically conductive polymer being aniline, the reaction changes color from pale green to dark green during the polymerization. After completion of polymerization, phase separation occurs with a lower layer being an aqueous phase containing the oxidative polymerization catalyst and the lower layer can be removed with ease.

If the amount of the monomers is below 3 weight %, the resulting polymer is poor in conductivity. On the other hand, when the monomers are used at an amount more than 30 weight %, the microgel particles coagulate. Further, if an amount of the organic solution containing the microgel particles is less than 15 weight %, the microgel particles are coagulated to cause the problem of instability. On the other hand, the use of the solution exceeding 80 weight % suffers from too low conductivity. When the oxidative polymerization catalyst is used at an amount less than 2 weight %, the polymerization proceeds too slowly. On the other hand, in the presence of more than 40 weight % of the oxidative polymerization catalyst, the polymerization rate is too high to avoid the coagulation of the microgel particles.

The preparation of the electrically conductive microgel is preferably carried out in the range of 0 to 80° C. The problem with the extra-range of the reaction temperature also resides in the polymerization rate. For example, if the reaction is carried out at less than 0° C., the polymerization proceeds too slowly. On the other hand, at higher than 80° C., the polymerization rate is so fast as to cause coagulation of the microgel particles. Depending on the concentration of the monomers and the polymerization temperature, it may take several seconds to several days to complete the polymerization.

With poor solubility in organic solvents, the electrically conductive polymer is adsorbed onto the surface of the microgel particles while being synthesized.

For the synthesis of the electrically conductive polymer in an organic solution containing the microgel particles are used monomers such as pyrrole, thiophene, indole, carbazole, furan, aniline, and derivatives thereof. For example, the pyrrole derivatives include N-methyl pyrrole, N-ethyl pyrrole, N-propyl pyrrole, and N-butyl pyrrole. Aniline derivatives useful in the present invention may be exemplified by N-alkyl aniline, 4-phenoxy aniline, 4-trimethylsilyl aniline, and 2,4-dimethoxy aniline 3,4-(alkylenedioxy)thiophene is also useful.

In the microgel particle-containing organic solution, the microgel particles are dispersed and stabilized through salvation by the hydrophobic organic solvent. The hydrophobic organic solvent is defined as being poorly water-compatible with a Hansen solubility parameter of 12.5 or less. Examples of the hydrophobic organic solvent available in the present invention include toluene, xylene, methylene chloride, chloroform, ethyl acetate and butyl acetate.

Oxidative polymerization catalysts that are generally used for preparing electrically conductive polymers are also used for the present invention. Their examples include ammonium persulfate, potassium persulfate, ferric chloride and ferric tosylate hydrogenperoxide.

To give rise to an increase in the conductivity of the microgel, the electrically conductive polymer is doped. Doping a conductive polymer entails chemically modifying the backbone to produce mobile charge carriers. With this purpose, commonly used dopants for preparing conductive polymers are usable in the present invention. Examples thereof include dodecylbenzenesulfonic acid, toluenesulfonic acid, camphorsulfonic acid, benzenesulfonic acid, hydrochloric acid, styrenesulfonic acid or 2-acrylamido-2-methylpropanesulfonic acid. The dopant is used in the mixture of the monomers for the synthesis of the electrically conductive polymer and preferably at an amount of 1 to 20 weight % based on the total weight of the whole solution (corresponding to an equivalent ratio of 0.3 to 1.5 to the monomers for the electrically conductive polymer). For instance, if the amount of the dopant is below 1 weight %, the polymer is doped insufficiently, resulting in low conductivity of the microgel. Over-doping with more than 20 weight % of the dopant also causes a decrease in conductivity of the electrically conductive microgel. According to the present invention, the electrically conductive microgel takes a core/shell structure in which electrically conductive polymers or oligomers are physically adsorbed onto internal crosslinked microgel particles.

For coating application, the electrically conductive microgel of the present invention may be combined with various binders, depending on the electrical conductivity and physical properties required for the coating. Associated with a binder, the microgel is maintained in a three dimensional structure when being dried (in the form of paint). Available as a binder in the present invention are those which are used in conventional paint. Suitable examples thereof include polyurethane resins, polyacrylic resins, thermosetting alkyd resins, and radiation curing vinyl monomers or oligomers. Preferably, the mixing ratic of the binder and the electrically conductive microgel of the present invention ranges 1:99 to 90:10 on the weight basis.

Optionally, a paint containing the electrically conductive microgel of the present invention may contain additives at an amount of up to 60 weight %. By way of example, not limitation, the additives include fillers and antioxidants. Useful as fillers are talc, barium sulfate, calcium carbonate, fibers, kaolin, pigment and conductive fillers. Additionally, in order to improve the performance of the electrically conductive film coated, an attaching enhancer, a thickener, a curing agent and/or an organic solvent are useful.

Organic solvents can be removed in a freeze drying process, a spray drying process or a vacuum drying process. To be useful as a solid material, the microgel of the present invention can be treated in an ordinary process (e. g., injection or extrusion molding). The electrically conductive materials or composite materials of the present invention can find applications in the electromagnetic-radio frequency interference shielding, antistatic, and anti-fog industries.

A better understanding of the present invention may be obtained in light of the following examples which are set forth to illustrate, but are not to be construed to limit the present invention.

PREPARATION EXAMPLE 1

Preparation of Microgel Through Emulsification Polymerization

To a reactor equipped with a stirrer, a reflux condenser, a thermometer and a four-necked funnel was charged 720 g of deionized water which was then heated to 80° C., followed by the addition of 3.2 g of CO-436 (Rhone-Poulenc) as a non-ionic emulsifier and 1.6 g of ammonium persulfate as an initiator to the reactor. A monomer mixture containing 60 g of N-butyl acrylate, 100 g of methyl methacrylate and 1 g of allyl methacrylate was added slowly over 2 hours. To the mixture was further added 10 g of an aqueous solution containing 0.6 g of ammonium persulfate. After being maintained at 80° C. for 2 hours, the reactor was cooled to room temperature. The resulting reaction was filtered through a 400 mesh nylon filter. The filtrate, a microgel emulsion, had a solid content of 18.5% with an average particle size of 80 nm.

228 g of n-butanol was added to 736 g of the microgel emulsion and stirred. After being allowed to stand for 4 hours, the solution was separated into two layers 640 g of the lower aqueous phase saturated with n-butanol was removed. To the upper layer containing the microgel was added 736 g of butyl acetate, after which the solution was azeotropically distilled in vacuo at 70° C. to eliminate undesired residual water. As a result, the microgel was dispersed in the organic solvent. This dispersion of microgel had a solid content of 33% and was found to contain a water content of 0.08 as measured by the Karl-Fisher titration method.

PREPARATION EXAMPLE 2

Preparation of Microgel through Non-Aqueous Dispersion

Into a 1 L reactor equipped with a stirrer, a thermometer, a reflux condenser and a four-necked funnel was charged 354.29 g of heptane which was then heated to 95° C. and the mixture of the ingredients given in the following Table 1 was then added:

TABLE 1

| Ingredient | Weight (g) |
|---|---|
| Methyl Methacrylate | 54.25 |
| Azodiisobutyronitrile | 4.20 |
| Graft Copolymer Stabilizer | 19.84 |

The contents of the reactor were maintained for 30 min at the same temperature to form a seed dispersion of polymer. Afterwards, the ingredients of the following Table 2 were fed as a mixture into the reactor at a steady rate over 3 hours. A dispersion of microgel particles in the organic solvent was obtained having a solid content of 52.1% and a gel content of 34.5%.

TABLE 2

| Ingredient | Weight (g) |
|---|---|
| Methyl methacrylate | 250.00 |
| Allyl methacrylate | 7.75 |
| Azodiisobutyronitrile | 3.38 |
| Graft copolymer stabilizer (see table 1) | 53.16 |

In both Tables 1 and 2, the graft copolymer stabilizer was obtained as follows. 12-Hydroxystearic acid was self-condensed to an acid value of about 31 to 34 mg KOH/g (a number average molecular weight of 1650 to 1800) and then reacted with an equivalent amount of glycidyl methacrylate. The unsaturated ester thus obtained was copolymerised at a weight ratio of 2:1 with a mixture of methyl methacrylate and acrylic acid in the proportion of 95:5.

EXAMPLE 1

6 g (solid content of 1.98 g) of the microgel obtained in Preparation Example 1 and 10 g of toluene were charged into a reactor and cooled to 0° C. Into the reactor, 2 g of dodecyl benzenesulfonic acid as a dopant, and 0.56 g of aniline were slowly added under stirring. A solution of 1.3 g of ammonium persulfate in 10 ml of water was injected in five installments at intervals of 30 min. As the aniline was polymerized, the reaction solution turned in color from milky to dark green. After 24 hours, the reaction, was stopped. Through the separation funnel, the lower aqueous layer containing the oxidant and ammonium persulfate was removed. The dark green microgel layer which remained was coated onto a glass plate and dried. The coating was measured to be 1.8 S/cm in specific conductivity.

EXAMPLE 2

4 g (solid content of 2.08 g) of the microgel obtained in Preparation Example 2 and 10 g of toluene were charged into a reactor and cooled to 0° C. Also, 2 g of dodecyl benzenesulfonic acid as a dopant, and 0.56 g of aniline were slowly added into the reactor under stirring. A solution of 1.3 g of ammonium persulfate in 10 ml of water was injected in five installments at intervals of 30 min. As the aniline was polymerized, the reaction solution turned in color from milky to dark green. After 24 hours, the reaction was stopped. Through the separation funnel, the lower aqueous layer containing the oxidant and ammonium persulfate was removed. The dark green microgel layer which remained was coated onto a glass plate and dried. The coating was measured to be 0.9 S/cm in specific conductivity.

EXAMPLE 3

6 g (solid content of 1.98 g) of the microgel obtained in Preparation Example 1 and 10 g of toluene were charged into a reactor and maintained at 20° C. Also, 0.56 g of pyrrole was slowly added into the reactor under stirring. The pyrrole was allowed to polymerize as 2.25 g of ferric chloride ($FeCl_3$) in 10 ml of water was slowly added. After 24 hours of polymerization, the reaction was stopped. Through the separation funnel, the lower aqueous layer was removed. The dark green microgel layer remaining in the upper layer was coated onto a glass plate and dried. The coating was measured to be 0.6 S/cm in specific conductivity.

EXAMPLE 4

4 g (solid content of 2.08 g) of the microgel obtained in Preparation Example 2 and 10 g of toluene were charged into a reactor and maintained at 20° C., followed by slowly adding 0.56 g of pyrrole under stirring. The pyrrole was allowed to polymerize as 2.25 g of ferric chloride ($FeCl_3$) in 10 ml of water was slowly added. After 24 hours of polymerization, the reaction was stopped. Through the separation funnel, the lower aqueous layer was removed. The dark green microgel layer remaining in the upper layer was coated onto a glass plate and dried. The coating was measured to be 0.3 S/cm in specific conductivity.

EXAMPLE 5

6 g (solid content of 1.98 g) of the microgel obtained in Preparation Example 1 and 10 g of toluene were charged into a reactor and maintained at 20° C. Also, a solution of 0.9 g of ferric tosylate (Fe(p-toluene sulphonate)$_3$) in 10 ml of water was slowly added and subsequently, 0.4 g of thiophene. The reaction mixture was allowed to react at 20° C. for 12 hours. Afterwards, the reaction was stopped. Through the separation funnel, the lower aqueous layer was removed. The dark green microgel layer which remained was coated onto a glass plate and dried. The coating was measured to be 0.7 S/cm in specific conductivity.

EXAMPLE 6

4 g (solid content of 2.08 g) of the microgel obtained in Preparation Example 2 and 10 g of toluene were charged into a reactor and maintained at 20° C. Also, a solution of 0.9 g of ferric tosylate (Fe(p-toluene sulphonate)$_3$) in 10 ml of water was slowly added and subsequently, 0.4 g of thiophene. The reaction mixture was allowed to react at 20° C. for 12 hours. Afterwards, the reaction was stopped. Through the separation funnel, the lower aqueous layer was removed. The dark green microgel layer remaining in the upper layer was coated onto a glass plate and dried. The coating was measured to be 7.5 S/cm in specific, conductivity.

EXAMPLE 7

Dispersed in an organic solvent, the microgel prepared in the present invention could be mixed with thermosetting paint and photosetting paint. The electroconductive microgel with a solid content of 15%, prepared in Example 1, was blended with commercially available photosetting paint, such as a product from Sunkyoung-UCB, Korea, identified as"R-100" (solid content 50%, Vicure 55 (a photoinitiator, Akzo Chemical) 4%), and the blend was coated on a poly(ethyleneterephthalate) (PET) film with the aid of a bar coater. After being allowed to stand at room temperature for 2 min, the coating was gelled using a fusion system process (2–300 watts/inch, H lamp 1.9 inch distant from the coating). The coating, made of photosetting paint containing the microgel, was transparent with a green color and measured to change in electroconductivity with the content of the microgel, as given in Table 3, below.

TABLE 3

| Example/ Photosetting Paint, R-100 | Conductive Microgel (Solid content, wt %) | Electro- conductivity (S/cm) |
| --- | --- | --- |
| 1  2/6 | 9 | $4 \times 10^{-7}$ |
| 2  2/4 | 13 | $3 \times 10^{-6}$ |
| 3  2/2 | 23 | $2 \times 10^{-5}$ |
| 4  4/2 | 37 | $7 \times 10^{-3}$ |

COMPARATIVE EXAMPLE 1

In a reactor equipped with a temperature controller was charged 200 g of ABS emulsion latex (ABS solid weight 80 g) at 0° C. A solution of 6.2 g (0.019 mole) of dodecylbenzene sulfonic acid and 2.2 g (0.012 mole) of paratoluene sulfonic acid in 200 ml of distilled water was added to the latex and stirred for a predetermined period of time. To this solution, aniline was added at an amount of 12.0 g (0,13 mole), which corresponded to 15% by weight of the ABS used. After being well mixed by stirring for 20 min, the solution was added with a solution of 8.8 g (0.039 mole) of ammonium persulfate in 200 g of distilled water over 30 min, followed by allowing the solution to react for 16 hours under a stirring condition. The precipitate which was formed as the reaction proceeded was filtered off, washed with distilled water and dried at 70° C. for 24 hours. The specific conductivity of the dried precipitate was measured to be 0.001 S/cm.

Despite use of a larger amount of the electrically conductive polymer than in the above Examples, there was obtained an electroconductivity which was 100 times lower.

As described hereinbefore, a three-dimensional array of polymers is formed on a solid phase to produce an electrically conductive microgel in accordance with the present invention. With this structural feature, the electrically conductive microgel of the present invention shows excellent electrical functions, including electrical conduction, electromagnetic-radio frequency interference shielding, and electrostatic prevention, in spite of its low content of electrically conductive polymers. Additionally, the electrically conductive microgel of the present invention enjoys the advantage of being easily blended with binders and curing agents, affording a coating which is transparent with an excellent conductivity.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing an electrically conductive microgel comprising, on the basis of the electrically conductive microgel, adding 3 to 30% weight % of a monomer for synthesizing an electrically conductive polymer and 1 to 20 weight % of a dopant to 15 to 80 weight % of an organic solution containing 5 to 60% weight % of microgel particles based on the organic solution; and polymerizing said monomer at a temperature of 0 to 80° C. with the addition of 2 to 40 weight % of an aqueous solution containing 1 to 40 weight % of an oxidative polymerization catalyst based on the aqueous solution in which the polymer is adsorbed on the surface of the microgel particles.

2. The method as set forth in claim 1, wherein the monomer is selected from the group consisting of pyrrole, thiophene, indole, carbazole, furan, aniline, N-methyl pyrrole, N-ethyl pyrrole, N-propyl pyrrole, N-butyl pyrrole, N-alkyl aniline, 4-phenoxy aniline, 4-trimethylsilyl aniline, 2,4-dimethoxy aniline, 3,4-(alkylenedioxy)thiophene, and mixtures thereof.

3. The method as set forth in claim 1, wherein the oxidative polymerization catalyst is selected from the group consisting of ammonium persulfate, ferric chloride and ferric tosylate hydrogenperoxide.

4. The method as set forth in claim 1, wherein the dopant is selected from the group consisting of dodecylbenzenesulfonic acid, toluenesulfonic acid, camphorsulfonic acid, benzenesulfonic acid, hydrochloric acid, styrenesulfonic acid and 2-acrylamido-2-methylpropanesulfonic acid.

5. The method as set forth in claim 1, wherein the microgel containing organic solution comprises a hydrophobic organic solvent and the microgel particles are dispersed and stabilized through solvation by the hydrophobic organic solvent.

6. The method as set forth in claim 5, wherein the hydrophobic organic solvent is poorly water-compatible with a Hansen solubility parameter of 12.5 or less.

7. The method as set forth in claim 6, wherein the organic solvent is selected from the group consisting of toluene, xylene, methylene chloride, chloroform, ethyl acetate and butyl acetate.

8. The method as set forth in claim 1, wherein the microgel particles are prepared by a non-aqueous dispersion process or by a combination of emulsification polymerization and aqueous-organic solvent conversion processes.

9. The method as set forth in claim 1, wherein the microgel particles range from 0.01 to 10 microns in particle size.

10. The method as set forth in claim 1, wherein the electrically conductive microgel takes a core/shell structure in which electrically conductive polymers or oligomers are physically adsorbed onto the internal cross-linked microgel particles.

11. An electrically conductive microgel prepared by the method of claim 1, for use in electrical conduction, electromagnetic-radio frequency interference shielding, electrostatic prevention or anti-fogging.

12. The electrically conductive microgel as set forth in claim 11, wherein the electrically conductive microgel is used in association with a binder, said binder being mixed at a weight ratio of 1:99 to 90:10 with said microgel.

* * * * *